United States Patent [19]

Gugle et al.

[11] Patent Number: 5,339,501
[45] Date of Patent: Aug. 23, 1994

[54] SNAP AND RATCHET PANEL FASTENER AND SUPPORT ASSEMBLY

[75] Inventors: James E. Gugle, Manhattan, Ill.; James S. Tisol, New Auburn, Wis.

[73] Assignee: Illinois Tool Works Inc., Glenview, Ill.

[21] Appl. No.: 21,882

[22] Filed: Feb. 24, 1993

[51] Int. Cl.⁵ .......................... A44B 21/00; E04B 1/00
[52] U.S. Cl. ..................... 24/573.1; 24/297; 52/471
[58] Field of Search .............. 24/573.1, 297, 573.2, 24/290, 289, 287, 453, 459; 411/383, 384; 52/471

[56] References Cited

U.S. PATENT DOCUMENTS

| | | | |
|---|---|---|---|
| 4,172,000 | 10/1979 | Horike et al. | 156/108 |
| 4,249,356 | 2/1981 | Noso | 52/717 |
| 4,506,419 | 3/1985 | Mitomi | 24/573.1 |
| 4,648,231 | 3/1987 | LaRoche | 24/459 |
| 4,698,882 | 10/1987 | Lang | 24/289 |
| 4,707,894 | 11/1987 | Friedwald | 24/297 |
| 4,861,208 | 8/1989 | Boundy | 24/297 |
| 4,890,966 | 1/1990 | Umezawa | 24/289 |
| 5,220,712 | 6/1993 | Taki et al. | 24/614 |

FOREIGN PATENT DOCUMENTS

| | | | |
|---|---|---|---|
| 0963624 | 3/1975 | Canada | 52/471 |

*Primary Examiner*—Victor N. Sakran
*Attorney, Agent, or Firm*—Schwartz & Weinrieb

[57] ABSTRACT

An adjustable fastener assembly which can readily be engaged and disengaged including a receptacle member, a connecting member and an engagement member for retaining the connecting member to the receptacle member upon engagement in a first direction, for maintaining retention and providing movement between the receptacle member and the connecting member for a predetermined distance in a second direction perpendicular to the first direction and for enabling disengagement of the connecting member from the receptacle member upon movement in the second direction beyond the predetermined distance.

26 Claims, 2 Drawing Sheets

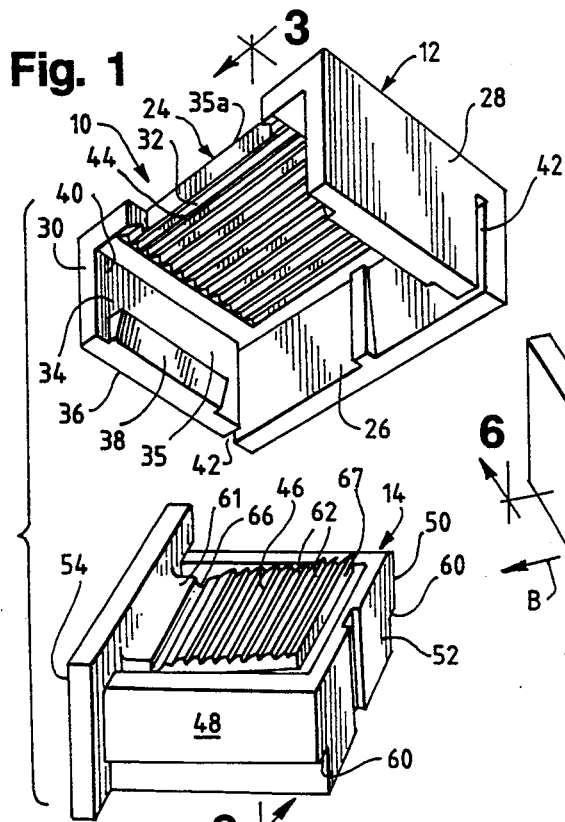
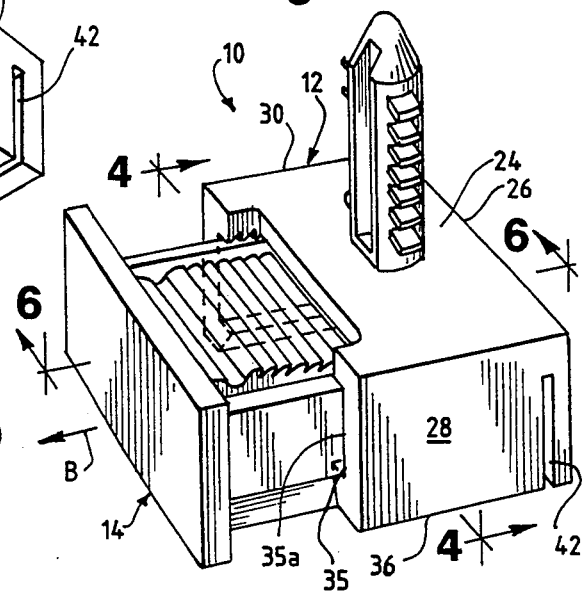
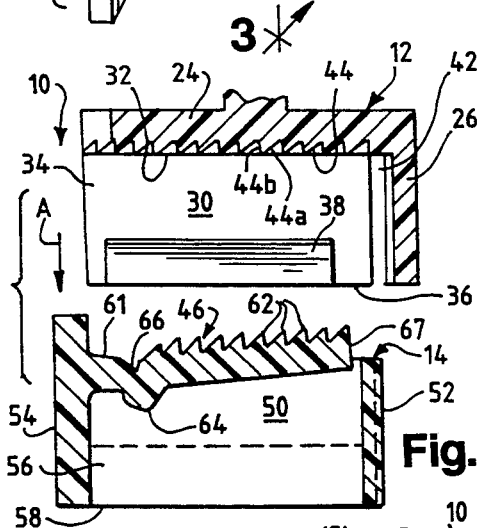
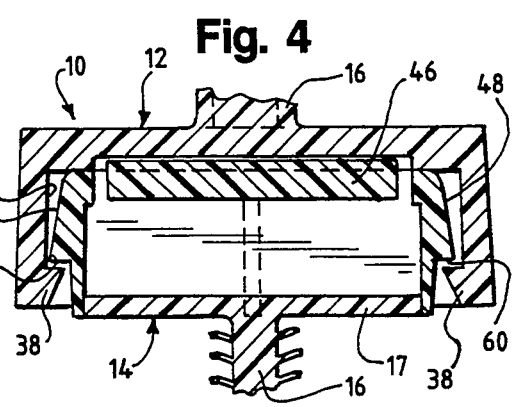
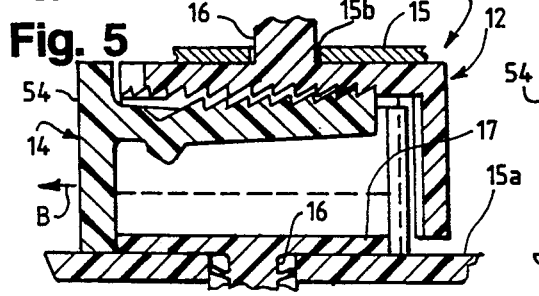
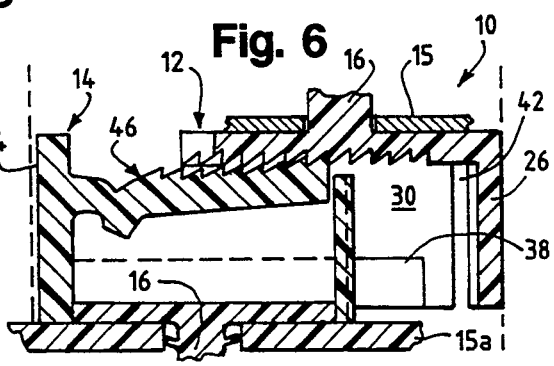

SNAP AND RATCHET PANEL FASTENER AND SUPPORT ASSEMBLY

BACKGROUND OF THE INVENTION

1. Field of the Invention

This invention relates generally to fasteners and more particularly to an adjustable fastener assembly which can be utilized to connect two panels or to support a windshield with respect to an automobile frame wherein the assembly includes two components which can be readily connected together upon snapping engagement in a first direction and thereafter adjusted in a ratcheting manner in a second direction perpendicular to the first direction for a predetermined distance beyond which the components become disengaged.

2. Description of the Related Art

Fasteners are typically utilized in automobile assembly operations so as to hold two or more panels together or to connect another article, such as a molding strip or the like, to a panel or another assembly. The fastener is typically inserted and retained within an aperture in a first panel and a second panel is attached to another portion of the fastener.

Fasteners are also known which support and position one member with respect to another member and are adjustable after initial positioning. An example of such a fastener is illustrated in U.S. Pat. No. 4,172,000 which discloses a method and device for fixing moldings on windshields having a molding clip which supports the windshield with respect to the frame of the car. The clip includes a supporting piece which is adhesively secured to an edge of the windshield. A movable holding piece is slidingly engaged to the supporting piece from one end thereof and held in position by a ratchet and pawl mechanism which allows movement in the same direction as the sliding engagement. After attaching the clip to the windshield and initial positioning of the windshield within the car frame, a molding piece is connected to the holding piece thereby enabling the molding piece to be moved with respect to the supporting piece so as to finally position and support the windshield against the car frame.

Such a fastener, however, is difficult to assemble due to its many parts and its sliding engagement in the same direction as the adjustment operation which is parallel to the windshield. Additionally, it does not enable ready engagement and disengagement and relies on a separate molding strip to provide the desired contact with the car frame.

It therefore would be desirable to provide a fastener assembly including two components which can readily be connected upon snapping engagement in a first direction, adjusted in a second direction perpendicular to the first direction and disengaged upon continued movement in the second direction.

The invention provides an adjustable fastener assembly which can readily be engaged and disengaged and includes a receptacle member and a connecting member. An engagement member is also included for retaining the connecting member to the receptacle member upon engagement in a first direction, for maintaining retention and providing movement between the receptacle and the connecting member for a predetermined distance in a second direction perpendicular to the first direction, and for enabling disengagement of the connecting member from the receptacle member upon movement in the second direction beyond the predetermined distance.

BRIEF DESCRIPTION OF THE DRAWINGS

Various objects, features, and attendant advantages of the present invention will be more fully appreciated from the following detailed description, when considered in connection with the accompanying drawings in which like reference characters designate like or corresponding parts throughout the several views, and wherein:

FIG. 1 is a perspective exploded view of the fastener assembly of the invention illustrating the receptacle member and the connecting member;

FIG. 2 is a perspective view of the assembled fastener assembly of the invention illustrating a partially adjusted position of the assembly and an additional fastener member secured to one side of the receptacle member;

FIG. 3 is a sectional view taken along line 3—3 of FIG. 1 in the direction indicated generally;

FIG. 4 is a sectional view taken along line 4—4 of FIG, 2 in the direction indicated generally;

FIG. 5 is a sectional view of an assembled fastener of the invention illustrated as connected to two panels;

FIG. 6 is a sectional view of an assembled fastener of the invention taken along line 6—6 of FIG. 2 in the direction indicated generally and connected to two panels;

DESCRIPTION OF THE PREFERRED EMBODIMENTS

Figure 7:
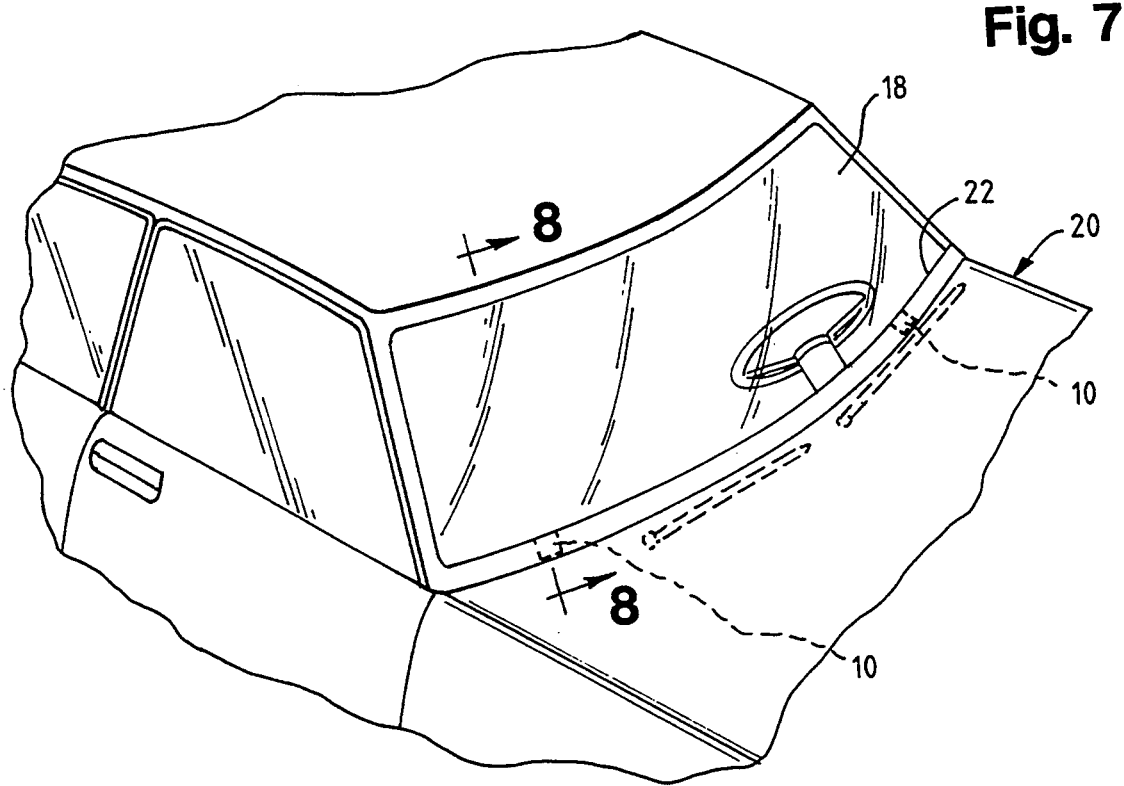
FIG 7 is a perspective view illustrating the fastener assembly in use to position a windshield with respect to an automobile frame.

Referring to FIG. 1, the fastener assembly of the invention is designated generally by the reference numeral 10. The assembly 10 includes two components, a receptacle member 12 and a connecting member 14, both of which preferably are made of plastic, but the material can vary.

Briefly, in operation, the connecting member 14 is engaged within the receptacle member 12 by a snap-fit provided by pressing engagement between the two members in a first direction "A" illustrated in FIG. 3. As FIG. 2 illustrates, after engagement, the connecting member 14 can be moved with respect to the receptacle member 12 in a direction "B", which is perpendicular to direction "A", so as to enable adjustment of the assembly 10 as desired.

Continued movement in direction "B" disengages the connecting member 14 from the receptacle member 12. Although the connecting member 14 is described as being moved with respect to the receptacle member 12, the receptacle member 12 can be moved with respect to the connecting member 14 or some combination therebetween.

The assembly 10 can be utilized to connect two members, such as a panel 15 and another panel or surface 15a, illustrated in FIG. 5, in an adjustable and releasable manner for proper alignment during manufacturing. Preferably, the receptacle member 12 includes a push-in type of connector 16 integrally formed with or otherwise secured to a desired surface of the receptacle 12 for insertion within an aperture 15b formed in the panel 15.

The connecting member 14 is preferably secured to the panel 15a by an adhesive or the like or, alternatively, can include a push-in connector 16 formed with a bottom surface 17 which encloses the connecting member 14. It is to be understood that the particular connection between the panels 15 and 15a, the receptacle member 12 and the connecting member 14 as well as the particular use of the assembly 10 can vary.

Figure 8:
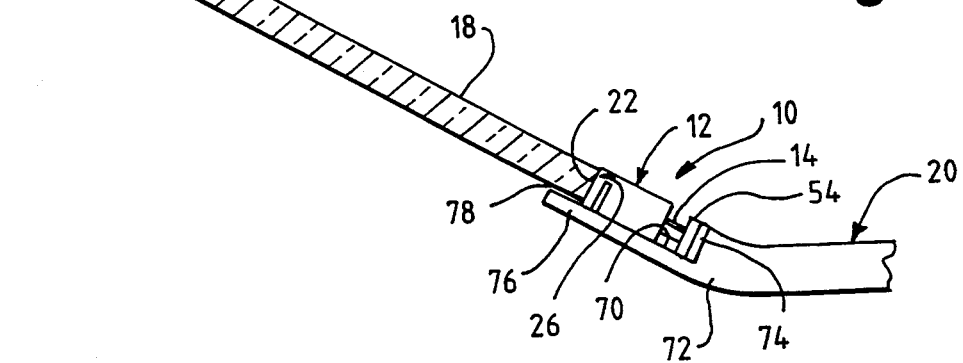
FIG. 8 is an enlarged sectional view of the fastener assembly in use with the windshield illustrated in FIG. 7.

FIGS. 7 and 8 illustrate another use of the assembly 10 which supports and positions a windshield 18 of an automobile 20. Preferably, two or more assemblies 10 are positioned along the bottom edge 22 of the windshield 18, but the assembly 10 can be utilized along as many sides of the windshield 18 as desired.

As FIGS. 1-3 illustrate, the receptacle member 12 preferably has a rectangular box-like configuration defined by a planar base 24, an end wall 26 and first and second side walls 28 and 30. The end wall 26 and the first and second side walls 28 and 30 are integrally formed with a first interior side 32 of the planar base 24 and extend a predetermined distance away from the interior side 32 to define an interior 34 of the receptacle 12. Thus, the interior 34 is open on a first side 35 opposite the planar base 24 and a first end 35a opposite the end wall 26.

To provide initial engagement of the connecting member 14 with the receptacle member 12, outer ends 36 of the side walls 28 and 30 include barbs 38 which define a channel 40 between the barbs 38 and the planar base 24 so as to accommodate the connecting member 14 when assembled. Preferably, to provide a degree of flexibility to the side walls 28 and 30 and enable the connecting member 14 to be captured therebetween, a slot 42 is provided through each side wall 28 and 30 proximate the end wall 26.

It is to be noted that the slots 42 also provide a cantilever structure by enabling flexing of the planar base 24 and side walls 28 and 30 in a downward direction with respect to FIG. 1 which is toward the end wall 26 and assists in providing ratcheting as described below. Additionally, when the assembly 10 is ratcheted as described below the planar base 24 and side walls 28 and 30 similarly pivot up and down to provide an overdrive feature and assure that the desired pressure is maintained between the receptacle 12 and the connecting member 14. This is particularly important so that the assembly 10 cannot be undesirably ratcheted to the next tooth.

In order to provide incremental or ratchet type sliding movement in only one direction between the receptacle member 12 and the connecting member 14, the planar base 24 can include a series of ratchet or saw teeth 44 for corresponding engagement with a portion of the connecting member 14. The number of ratchet teeth 44 can vary so as to provide a predetermined amount of movement between the receptacle member 12 and the connecting member 14.

The teeth 44 are tapered in a forward position which is to the left with respect to FIG. 3. Thus, each tooth 44 includes a first ramped surface 44a and a second surface 44b substantially perpendicular to the planar base 24.

The connecting member 14 is also formed in a box-like configuration defined by a substantially planar top 46, first and second opposite side walls 48 and 50, and first and second opposite end walls 52 and 54 so as to form an interior space 56. Thus, the connecting member 14 is preferably open only on a bottom surface 58 and its dimensions are smaller than the receptacle member 12 so as to enable the receptacle member 12 to capture the connector member 14.

As FIGS. 1 and 4 illustrate, the first and second side walls 48 and 50 of the connecting member 14 are tapered outwardly from top to bottom and include a shoulder 60 for locking engagement with the barbs 38 of the receptacle member 12. To assist in providing contact between the connecting member 14 and another article, such as a panel, the second end wall 54 can be enlarged beyond the top 46, as FIGS. 1 and 3 illustrate, and the first and second side walls 48 and 50, but is preferably flush with the open bottom surface 58.

To provide the desired ratchet-type engagement between the receptacle member 12 and the connecting member 14, only the top 46 is connected at a proximal end 61 to the second end wall 54 and includes a plurality of ratchet or saw teeth 62. To provide biased engagement of the ratchet teeth 62 with the ratchet teeth 44, the top 46 is formed at a slight upward angle and flexes about its proximal end 61. To assist in flexing and provide strength to the top 46, a ridge 64 can be included on one side of the top surface 46 and can be relieved at 66.

Preferably, only three or four of the outermost teeth 62 proximate a distal end 67 of the top 46 engage respective teeth 44 of the planar base 24. It is to be understood, however, that the number of ratchet teeth 62 engaged with the ratchet teeth 44 can vary.

When utilized to connect two panels 15 and 15a as illustrated in FIG. 5, the bottom surface 17 of the connecting member 14 first is secured to the panel 15a, such as by the connector 16, an adhesive or the like. The receptacle member 12 is then inserted over the connecting member 14 by engaging and outwardly flexing the side walls 28 and 30 of the receptacle member 12 upon contact with the tapered side walls 48 and 50 of the connecting member 14 until the barbs 38 seat against the shoulders 60 as illustrated in FIG. 4. In this position the tapered portions of the side walls 48 and 50 are seated within the channel 40 of the receptacle member 12 and the ratchet teeth 44 and 62 are engaged.

It is to be noted that when assembled the bottom surface 17 of the connecting member 14 slightly protrudes outside the confines of the receptacle 12 so as to maintain contact with the panel 15a. Thereafter, the connector 16 of the receptacle 12 is inserted within the aperture 15b formed in the panel 15 so as to connect the two panels together.

To incrementally adjust the two panels 15 and 15a, the panels are moved with respect to each other causing the connecting member 14 to ratchet outward in the direction of arrow "B". Due to the design of the ratchet teeth 44 and 62, return movement of the connecting member 14 in a direction opposite to "B" is prohibited without shearing the ratchet teeth 44 and 62. Continued movement in the direction of arrow "B" causes disengagement of the connecting member 14 from the receptacle 12 and in turn the two panels 15 and 15a.

In use, to assemble the two panels 15 and 15a illustrated in FIG. 5, the receptacle member 12 and the connecting member 14 are connected to respective panels 15 and 15a as described above. The connecting member 14 is then brought into snapping engagement upon face-to-face contact with the receptacle member 12 in direction "A" and the panels 15 and 15a are connected. If adjustment between the panels 15 and 15a is required, panel 15a is moved in the direction of arrow "B" causing the assembly 10 to move incrementally due to the action between the ratchet teeth 44 and 62. Continued movement in the direction of arrow "B" disengages the connecting member 14 from the receptacle member 12 and the panels 15 and 15a are no longer connected.

When utilized with a windshield 18 as FIGS. 7 and 8 illustrate, the connector assembly 10 is first positioned within a recess 70 formed in a frame 72 of an automobile 20. Preferably, the second end wall 54 of the connecting member 14 is positioned against a shoulder 74 of the frame recess 70. The bottom edge 22 of the windshield 18 is then positioned against the end wall 26 of the receptacle member 12 within an outer portion 76 of the recess 70. Thereafter, the connecting member 14 and the receptacle member 12 can be moved apart which in turn adjusts the windshield 18 away from the shoulder 74 to a desired position.

Alternatively, the connecting member 14 can first be secured to the recess 70, such as with a connector 16, an adhesive or the like, and the receptacle member 12 can be connected to the connecting member 14 and adjusted with the windshield 18 as described above. If desired, a bead of adhesive 78 can be applied to the outer portion 76 of the recess 70 before the windshield 18 is set in place.

Modifications and variations of the present invention are possible in light of the above teachings. It therefore is to be understood that within the scope of the appended claims, the invention may be practiced otherwise than as specifically described.

What is claimed and desired to be secured by Letters Patent is:

1. An adjustable fastener assembly which can be readily engaged and disengaged, comprising:
    a receptacle member
    a connecting member for disposition within said open space of said receptacle member in a first direction;
    first engagement means defined between said receptacle and connecting members for connecting said connecting member to said receptacle member upon engagement of said first engagement means as a result of movement of said connecting member relative to said receptacle member in said first direction, for maintaining said connection of said connecting member to said receptacle member by preventing disconnection of said connecting member from said receptacle member in a direction opposite to said first direction, and for permitting relative movement between said receptacle member and said connecting member for a predetermined distance in a second direction, which is perpendicular to said first direction, while enabling disconnection of said connecting member from said receptacle member upon relative movement between said receptacle member and said connecting member in said second direction a distance amount beyond said predetermined distance; and
    second engagement means defined between said receptacle member of said connecting member for permitting positional adjustment of said connecting member relative to said receptacle member in said second direction while preventing position adjustment of said connecting member relative to said receptacle member in a direction opposite to said second direction.

2. The fastener assembly as defined in claim 1, wherein:
    said receptacle member includes a planar base and at least two resilient side walls extending from a first side of said planar base and having a predetermined height and length and positioned a predetermined distance apart so as to form a receptacle therebetween for receiving and retaining said connecting member therein;
    said connecting member has at least two side walls positioned a predetermined distance apart so as to be disposable within said receptacle of said receptacle member and between said side walls of said receptacle member; and
    said first engagement means comprises barb ledge means formed upon said side walls of said receptacle member at positions spaced from said planar base so as to define channel portions therebetween, and shoulder means formed upon said side walls of said connecting member.

3. The fastener assembly as set forth in claim 2, wherein:
    said side walls of said receptacle member include slot means defined therein for providing flexibility to said side walls of said receptacle member in order to permit said barb ledge means of said side walls of said receptacle member to snappingly engage over said shoulder means of said side walls of said connecting member.

4. The fastener assembly as set forth in claim 2, wherein:
    said second engagement means comprises a first set of ratchet teeth disposed upon an interior surface of said planar base of said receptacle member, and a second set of ratchet teeth disposed upon an exterior surface of a planar base of said connecting member.

5. The fastener assembly as set forth in claim 4, wherein:
    said planar base of said connecting member is hingedly connected to an end wall of said connecting member so as to flexibly bias said second ratchet teeth of said connecting member into engagement with said first set of ratchet teeth of said receptacle member.

6. The fastener assembly as defined in claim 1 including means for connecting said receptacle member to a first article.

7. The fastener assembly as defined in claim 3 including means for connecting said connecting member to a second article, said assembly enabling said first and second articles to be connected, adjusted and disengaged as desired.

8. The fastener assembly as defined in claim 1, wherein:
    said second engagement means comprises a plurality of ratchet-teeth disposed upon said receptacle and connecting members for defining a ratchet assembly for providing incremental movement between said receptacle member and said connecting member in said second direction.

9. A fastener assembly for adjustably and releasably connecting two panels together, comprising:
    a receptacle member having an open space;
    means for connecting said receptacle member to a first planar surface of a first panel;
    a connecting member for disposition within said open space of said receptacle member in a first direction;
    means for connecting said connecting member to a first planar surface of a second panel;

first engagement means defined between said receptacle and connecting members for releasably connecting said connecting member to said receptacle member upon engagement of said first engagement means as a result of movement of said connecting member relative to said receptacle member in said first direction, for maintaining said connection of said connecting member to said receptacle member by preventing disconnection of said connecting members from said receptacle member in a direction opposite to said first direction, and for permitting relative movement between said receptacle member and said connecting member, and in turn, said first and second panels, for a predetermined distance in a second direction, which is perpendicular to said first direction, while enabling disconnection of said connecting member from said receptacle member, and in turn, said first and second panels, upon relative movement between said receptacle member and said connecting member in said second direction a distance amount beyond said predetermined distance; and second engagement means defined between said receptacle member and said connecting member for permitting positional adjustment of said connecting member relative to said receptacle member in said second direction while preventing positional adjustment of said connecting member relative to said receptacle member in a direction opposite to said second direction.

10. The fastener assembly as set forth in claim 9, wherein:

said receptacle member comprises a planar base, and at least two flexibly resilient side walls extending from said planar base so as to form with said planar base a receptacle within which said connecting member is to be disposed;

said connecting member comprises at least one end wall, at least two side walls connected to said at least one end wall, and a planar base connected to said at least one end wall; and said first engagement means comprises barb ledge means formed upon said side walls of said receptacle member at positions spaced from said planar base of said receptacle member so as to define channel portions therebetween, and shoulder means formed upon said side walls of said connecting member for disposition within said channel portions of said receptacle member so as to engage said barb ledge means of said receptacle member.

11. The fastener assembly as set forth in claim 10, wherein:

said side walls of said receptacle member include slot means defined therein for providing flexibility to said side walls of said receptacle member in order to permit said barb ledge means of said side walls of said receptacle member to snappingly engage over said shoulder means of said side walls of said connecting member.

12. The fastener assembly as set forth in claim 10, wherein:

said second engagement means comprises a first set of ratchet teeth disposed upon an interior surface of said planar base of said receptacle member, and a second set of ratchet teeth disposed upon an exterior surface of said planar base of said connecting member.

13. The fastener assembly as set forth in claim 12, wherein:

said planar base of said connecting member is hingedly connected to said at least one end wall of said connecting member so as to flexibly bias said second set of ratchet teeth of said connecting member into engagement with said first set of ratchet teeth of said receptacle member.

14. The fastener assembly as set forth in claim 9, wherein:

said second engagement means comprises a plurality of ratchet teeth disposed upon said receptacle and connecting members for defining a ratchet assembly for providing incremental movement between said receptacle member and said connecting member in said second direction.

15. A windshield support assembly, comprising:

a receptacle member having a first surface for engaging a portion of a windshield, and an open space;

a connecting member, for disposition within said open space of said receptacle member in a first direction, having a first surface for engaging a windshield frame portion of an automobile;

first engagement means defined between said receptacle and connecting members for releasably connecting said connecting member to said receptacle member upon engagement of said first engagement means as a result of movement of said connecting member relative to said receptacle member in said first direction, for maintaining said connection of said connecting member to said receptacle member by preventing disconnection of said connecting member from said receptacle member in a direction opposite to said first direction, and for permitting relative movement between said receptacle member and said connecting member for a predetermined distance in a second direction, which is perpendicular to said first direction, for supporting said windshield at a desired position with respect to said frame portion while enabling disconnection of said connecting member from said receptacle member upon relative movement between said receptacle member and said connecting member in said second direction a distance amount beyond said predetermined distance; and second engagement means defined between said receptacle member and said connecting member for permitting positional adjustment of said connecting member relative to said receptacle member in said second direction while preventing positions adjustment of said connecting member relative to said receptacle member in a direction opposite to said second direction.

16. The windshield assembly as set forth in claim 15, wherein:

said receptacle member comprises a planar base, and at least two flexibly resilient side walls extending from said planar base so as to form with said planar base a receptacle within which said connecting member is to be disposed;

said connecting member comprises at least one end wall, at least two side walls connected to said at least one end wall, and a planar base connected to said at least one end wall; and said first engagement means comprises barb ledge means formed upon said side walls of said receptacle member at positions spaced from said planar base of said receptacle member so as to define channel portions therebetween, and shoulder means formed upon said side walls of said connecting member for disposition within said channel portions of said receptacle men, her so as to engage said barb ledge means of said receptacle member.

17. The windshield assembly as set forth in claim 16, wherein:

said side walls of said receptacle member include slot means defined therein for providing flexibility to said side walls of said receptacle member in order to permit said barb ledge means of said side walls of said receptacle member to snappingly engage over said shoulder means of said side walls of said connecting member.

18. The windshield assembly as set forth in claim 16, wherein:

said second engagement means comprises a first set of ratchet teeth disposed upon an interior surface of said planar base of said receptacle member, and a second set of ratchet teeth disposed upon an exterior surface of said planar base of said connecting member.

19. The windshield assembly as set forth in claim 18, wherein:

said planar base of said connecting member is hingedly connected to said at least one end wall of said connecting member so as to flexibly bias said second set of ratchet teeth of said connecting member into engagement with said first set of ratchet teeth of said receptacle member.

20. The windshield assembly as set forth in claim 15, wherein:

said second engagement means comprises a plurality of ratchet teeth disposed upon said receptacle and connecting members for defining a ratchet assembly for providing incremental movement between said receptacle member and said connecting member in said second direction.

21. An adjustable fastener assembly which can be readily engaged and disengaged, comprising:

a receptacle member having an open space;

a connecting member for disposition within said open space of said receptacle member in a first direction;

first engagement means defined between said receptacle and connecting members for connecting said connecting member to said receptacle member upon engagement of said first engagement means as a result of movement of said connecting member relative to said receptacle member in said first direction, for maintaining said connection of said connecting member to said receptacle member by preventing disconnection of said connecting member from said receptacle member in a direction opposite to said first direction, and for permitting relative movement between said receptacle member and said connecting member for a predetermined distance in a second direction, which is perpendicular to said first direction, while enabling disconnection of said connecting member from said receptacle member upon relative movement between said receptacle member and said connecting member in said second direction a distance amount beyond said predetermined distance; and second engagement means defined between said receptacle member and said connecting member, and engaged upon engagement of said first engagement means as a result of said movement of said connecting member relative to said receptacle member in said first direction, for permitting positional adjustment of said connecting member relative to said receptacle member in said second direction while preventing positional adjustment of said connecting member relative to said receptacle member in a direction opposite to said second direction.

22. The fastener assembly as set forth in claim 21, wherein:

said receptacle member comprises a planar base, and at least two flexibly resilient side walls extending from said planar base so as to form with said planar base a receptacle within which said connecting member is to be disposed;

said connecting member comprises at least one end wall, at least two side walls connected to said at least one end wall, and a planar base connected to said at least one end wall; and said first engagement means comprises barb ledge means formed upon said side walls of said receptacle member at positions spaced from said planar base of said receptacle member so as to define channel portions therebetween, and shoulder means formed upon said side walls of said connecting member for disposition within said channel portions of said receptacle member so as to engage said barb ledge means of said receptacle member.

23. The fastener assembly as set forth in claim 22, wherein:

said side walls of said receptacle member include slot means defined therein for providing flexibility to said side walls of said receptacle member in order to permit said barb ledge means of said side walls of said receptacle member to snappingly engage over said shoulder means of said side walls of said connecting member.

24. The fastener assembly as set forth in claim 22, wherein:

said second engagement means comprises a first set of ratchet teeth disposed upon an interior surface of said planar base of said receptacle member, and a second set of ratchet teeth disposed upon an exterior surface of said planar base of said connecting member.

25. The fastener assembly as set forth in claim 24, wherein:

said planar base of said connecting member is hingedly connected to said at least one end wall of said connecting member so as to flexibly bias said second set of ratchet teeth of said connecting member into engagement with said first set of ratchet teeth of said receptacle member.

26. The fastener assembly as set forth in claim 21, wherein:

said second engagement means comprises a plurality of ratchet teeth disposed upon said receptacle and connecting members for defining a ratchet assembly for providing incremental movement between said receptacle member and said connecting member in said second direction.

* * * * *